US009475534B2

United States Patent
Gibson et al.

(10) Patent No.: US 9,475,534 B2
(45) Date of Patent: Oct. 25, 2016

(54) LOCKING THREADLESS BICYCLE HEADSET

(71) Applicants: Corrina Ladakis Gibson, La Canada, CA (US); Brandon Mark Benjamin, La Canada, CA (US)

(72) Inventors: Corrina Ladakis Gibson, La Canada, CA (US); Brandon Mark Benjamin, La Canada, CA (US)

( * ) Notice: Subject to any disclaimer, the term of this patent is extended or adjusted under 35 U.S.C. 154(b) by 58 days.

(21) Appl. No.: 14/043,847

(22) Filed: Oct. 2, 2013

(65) Prior Publication Data

US 2015/0091272 A1    Apr. 2, 2015

(51) Int. Cl.
| | | |
|---|---|---|
| *B62H 5/04* | (2006.01) | |
| *B62H 5/06* | (2006.01) | |
| *B62K 19/32* | (2006.01) | |
| *B62K 21/12* | (2006.01) | |
| *B62K 21/18* | (2006.01) | |
| *B62K 21/24* | (2006.01) | |

(52) U.S. Cl.
CPC *B62H 5/06* (2013.01); *B62H 5/04* (2013.01); *B62K 19/32* (2013.01); *B62K 21/12* (2013.01); *B62K 21/18* (2013.01); *B62K 21/24* (2013.01)

(58) Field of Classification Search
CPC ...... B62K 21/02; B62K 21/04; B62K 21/06; B62K 21/12; B62K 21/18; B62K 21/22; B62K 21/24; B62K 19/32; E05B 73/00; B62H 5/02; B62H 5/04; B62H 5/06
See application file for complete search history.

(56) References Cited

U.S. PATENT DOCUMENTS

| 528,874 | A | * | 11/1894 | Hall | B62K 21/08 280/272 |
|---|---|---|---|---|---|
| 4,509,349 | A | * | 4/1985 | Partridge | 70/233 |
| 5,085,063 | A | * | 2/1992 | Van Dyke et al. | 70/218 |
| 5,331,864 | A | * | 7/1994 | Chi | B62K 21/06 280/279 |
| 5,332,245 | A | * | 7/1994 | King | 280/279 |
| 5,476,020 | A | * | 12/1995 | Garvey et al. | 74/551.1 |
| 5,517,878 | A | * | 5/1996 | Klein et al. | 74/551.3 |
| 6,623,021 | B1 | * | 9/2003 | Nelson | 280/204 |
| 6,698,781 | B1 | * | 3/2004 | Blake | 280/279 |
| 6,783,141 | B1 | * | 8/2004 | Backhaus | 280/279 |
| 7,069,812 | B1 | * | 7/2006 | Rettig | B62K 21/16 280/279 |
| 8,302,981 | B1 | * | 11/2012 | Ma | 280/279 |
| 2003/0110880 | A1 | * | 6/2003 | Tison et al. | 74/551.8 |

(Continued)

FOREIGN PATENT DOCUMENTS

| DE | 355624 C | * | 6/1922 | B62H 5/06 |
|---|---|---|---|---|
| DE | 543863 C | * | 2/1932 | B62H 5/06 |

(Continued)

*Primary Examiner* — Joseph Rocca
*Assistant Examiner* — Maurice Williams (57) ABSTRACT

The set of bicycle headsets that are threadless and/or have pressed frame cups/races can be locked to prohibit the nominal rotation of the headset and bicycle handlebars about the bicycle's steer tube by this invention. This invention uses standard threadless headset components in addition to three newly invented components: The upper head tube race with spin-lock grooves, the external ring lock, and the headset spacer with spin-lock grooves. The locking configuration is achieved by mating male pins on the interior surface of the external ring lock with female spin-lock grooves that are on the exterior surfaces of the upper head tube race with spin-lock grooves and headset spacer with spin-lock grooves. There are a sets of spin-lock grooves that, when the male pins are mated accordingly, provide the locked and unlocked configurations of the headset.

7 Claims, 6 Drawing Sheets

(56) References Cited

U.S. PATENT DOCUMENTS

| | | | |
|---|---|---|---|
| 2004/0164515 A1* | 8/2004 | Gunter et al. | 280/293 |
| 2005/0206120 A1* | 9/2005 | Liao | 280/281.1 |
| 2006/0169009 A1* | 8/2006 | Niedrig | 70/186 |
| 2006/0220393 A1* | 10/2006 | Dimig et al. | 292/251.5 |
| 2007/0170690 A1* | 7/2007 | Hermansen et al. | 280/280 |
| 2008/0048412 A1* | 2/2008 | Dror | 280/288.3 |
| 2008/0127770 A1* | 6/2008 | Morelli | B62J 1/08 74/551.1 |
| 2008/0205981 A1* | 8/2008 | Weidner | 403/371 |
| 2009/0057505 A1* | 3/2009 | Chen | 248/185.1 |
| 2009/0090212 A1* | 4/2009 | Lacreu | 74/551.3 |
| 2009/0108558 A1* | 4/2009 | Kettler et al. | 280/279 |
| 2009/0218785 A1* | 9/2009 | Tsai et al. | 280/279 |
| 2010/0132502 A1* | 6/2010 | Lacreu | 74/551.3 |
| 2010/0269619 A1* | 10/2010 | Corbin | 74/473.13 |
| 2011/0187072 A1* | 8/2011 | Park | 280/204 |
| 2011/0241309 A1* | 10/2011 | Rioux et al. | 280/279 |
| 2012/0146303 A1* | 6/2012 | Wilson | 280/87.042 |
| 2012/0187646 A1* | 7/2012 | Turner | B62K 15/006 280/87.05 |
| 2013/0038030 A1* | 2/2013 | Baron | 280/7.17 |
| 2013/0076000 A1* | 3/2013 | Man | 280/279 |

FOREIGN PATENT DOCUMENTS

| | | | | |
|---|---|---|---|---|
| DE | 626163 C | * | 2/1936 | B62H 5/06 |
| DE | 19962468 A1 | * | 7/2000 | B62K 9/02 |
| FR | 2955080 A1 | * | 7/2011 | B62H 7/00 |

* cited by examiner

LOCKING THREADLESS BICYCLE HEADSET

FIELD OF THE INVENTION

This invention relates to a bicycle headset with a mechanical system that can lock the headset against relative rotation.

BACKGROUND OF THE INVENTION

A bicycle headset is an assembly of components on a bicycle that provides support and stability to the bicycle steer tube while it rotates within the bicycle head tube. A standard bicycle headset assembly is defined in the U.S. patent application Ser. No. 13/346,774 to Ma; Yun (Shimano). It states that a typical bicycle headset has two cups that are pressed into the top and bottom of the head tube and bearings to provide low friction contact between the cups and the steer tube.

Generally, there are two types of threadless headsets: Conventional threadless headsets and internal-headset systems (can include but is not limited to zero-stack, integrated-with-cups, semi-Integrated, or low profile systems). Conventional threadless headsets use frame races that are pressed into the bike headtube, while internal-headset systems use pressed cups that act as a holder for the bearings. The races and cups have flanges allowing them to mate to the outer edge of the top and bottom of the headtube in the axial direction. Headsets that utilize pressed races or pressed cups are compatible with the locking mechanism specified in this invention.

The locking mechanism for a bicycle headset defined in this invention allows the cyclist (user of the bicycle) to quickly and easily enable or disable the rotation of the bicycle's handlebars. The option to disable handlebar rotation is desired when the cyclist uses a vehicle bicycle rack to transport her bicycle, the cyclist needs to store her bicycle in a small area or hang her bicycle, the cyclist needs to park her bicycle by leaning it against a surface and does not want the bicycle to turn, roll and fall, the cyclist wants to park many bicycles closely together (for retail store bicycle displays, for example).

SUMMARY OF THE INVENTION

A novel aspect of this invention is enabling threadless headsets to be locked from nominal rotation. By prohibiting headset rotation, bicycle handlebars are inherently fixed.

The locking threadless headset assembly consists of the following: 1) A crown race, bearing, and lower head tube race, all of which are about the steer tube and below the head tube; 2) A star nut, which is inside of the steer tube; and 3) An upper head tube race with spin-lock grooves, external ring lock, bearing, centering sleeve, headset spacer with spin-lock grooves, seal, top cap, and cap bolt, all of which are above the head tube. This locking threadless headset assembly uses conventional threadless headset components in addition to three newly invented locking threadless bicycle headset components: The upper head tube race with spin-lock grooves, the external ring lock, and the headset spacer with spin-lock grooves. These novel components in addition to other parts, characteristics and advantages of the present invention are specified in the detailed description and assembly and part drawings in order to disclose preferred embodiments.

The upper head tube race with spin-lock grooves component is fixed to the top of the bicycle frame's head tube. The headset spacer with spin-lock grooves component rotates freely in accordance with handlebar rotation about the bicycle frame's head tube when in the nominal, unlocked position. The upper head tube race with spin-lock grooves and the headset spacer with spin-lock grooves component have female horizontal and vertical grooves that span across their exterior cylindrical surfaces with click-in grooves that enable unlocked, safe, and locked configurations.

The interior cylindrical surface of the external ring lock component sits flush about the two grooved components (race and spacer) and has a seal at both of its axial ends. Additionally, the interior surface of the external ring lock has two fixed radially protruding male pins that mate with the female grooves of the two grooved components (race and spacer). The external ring rotates freely about the horizontal grooves when its mating pins are not in any of the vertical female click-in grooves; The external ring fixes the entire locking threadless bicycle headset assembly, prohibiting rotation of the headset and handlebars, when the external ring's mating pins are in the locked vertical click-in groove positions; The external ring enables nominal free rotation of the headset and handlebars, when the external ring's mating pins are in the unlocked vertical female click-in groove positions.

BRIEF DESCRIPTION OF THE DRAWING

Referring now to the attached drawings which form a part of this original disclosure:

FIG. 5.A is a side view illustrating the placement of the pins (4.1 and 4.2) on the interior cylindrical surface of the external ring lock (component 2). As shown, the two pins are offset from each other in the radial and axial directions. In the axial direction, Pin 4.1 is closer to the bottom axial end of the external ring 2, while pin 4.2 is closer to the top axial end of the ring 2. This pin offset allows the following configurations:

FIG. 5.B shows the unlocked configuration. The two arrows extending from the external ring 2 on the left side of the figure to the assembled locking components indicate where the external ring sits about the race 1 and spacer 3 when assembled. Additionally, the two pins (4.1 and 4.2) on the external ring 2 can be seen in the grooves of the assembled locking components 1 and 3. The unlocked configuration is obtained when pin 4.1 is at the bottom of vertical groove 6.1 while pin 4.2 is at the bottom of vertical groove 6.2.

FIG. 5.0 shows the safe configuration, which is obtained by sliding the pins (4.1 and 4.2) of the external ring lock 2 through the grooves until pin 4.1 is at the bottom of vertical groove 6.2 and pin 4.2 is in vertical groove 6.3. This configuration provides a boundary between the unlocked and locked configurations as a measure of safety for the cyclist.

FIG. 5.D shows the locked configuration, which is obtained when pin 4.1 slid to the bottom of vertical groove 6.3 while pin 4.2 is slid to the bottom of vertical groove 6.5.

The locked configuration prohibits the free rotation of the headset about the steer tube because the external ring lock (component 2) and its pins (4.1 and 4.2) attach the freely rotating headset spacer (component 3) to the fixed race (component 1) by their vertical female grooves. By affixing the headset spacer to the race, the entire headset, the stem, and the handlebars of the bicycle are prohibited from free rotation about the steer tube. Applied axial pressure from the headset cap bolt couples the freely rotating headset components as well as the stem, providing the ability to prohibit free rotation of the headset, stem and handlebars about the steer tube by affixing the headset spacer 3 to the fixed race 1. Vertical groove 6.2 and horizontal groove 5.2 exist only for the safety of the cyclist as these grooves provide a boundary between the locked (to be used while not cycling) and unlocked (to be used while cycling) headset configurations. The two pins (4.1 and 4.2) are fixed to the external ring lock, requiring the external ring lock to be rotated in the radial direction and translated in the axial direction to slide the pins along the horizontal and vertical grooves and into their locked, safe and unlocked configurations.

FIG. 6 is a perspective side view illustrating the assembled locking components of the locking threadless bicycle headset. The external ring lock 2 is sufficiently wide in the axial direction to cover the spin-lock grooves of the race and headset spacer in all possible configurations of components 1, 2, and 3. Additionally, the interior cylindrical surface of the external ring lock component 2 sits flush about the two grooved components (1 and 3) and has a seal at both of its axial ends to prevent external particles from entering the area between the external ring lock 2 and the grooved components (1 and 3).

DESCRIPTION OF THE PREFERRED EMBODIMENT

A preferred embodiment will now be explained with reference to the drawings. It will be apparent to those skilled in the art from this disclosure that the following descriptions of the embodiment are provided for illustration only and not for the purpose of limiting the invention as defined by the appended claims and their equivalents.

Figure 1:
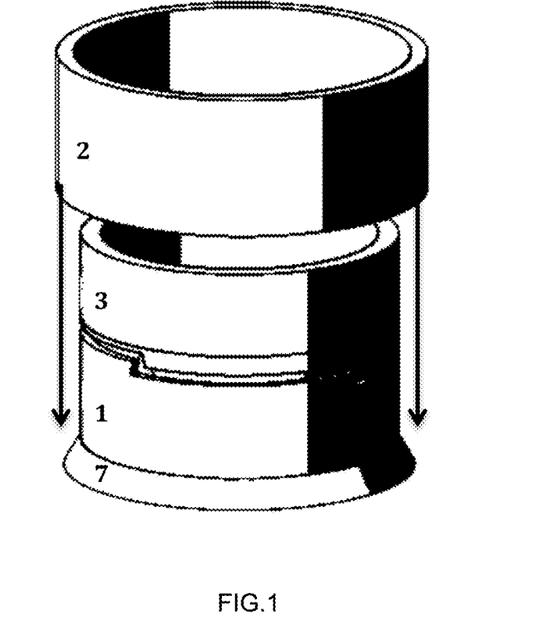
FIG. 1 is a solid model of the assembled locking components of the locking threadless bicycle headset. As shown, the three components that provide the locking capability to the headset are the upper head tube race with spin-lock grooves (component 1), external ring lock (component 2), and headset spacer with spin-lock grooves (component 3). The two arrows protruding from the external ring lock 2 indicate that the external ring lock 2 fits over the headset spacer 3 and head tube race 1 up to the race's flange (component 7). When 1, 2, and 3 are assembled on a bicycle, the ring 2 sits about the spacer 3 and race 1.

Referring initially to FIG. 1, the three locking components of the locking threadless bicycle headset are illustrated where the external ring lock 2 is sized to fit flush around the upper head tube race with spin-lock grooves 1 and headset spacer with spin-lock grooves 3. The flange 7 on the race 1 is pressed into a bicycle head tube, fixing the race 1 from rotation about a bicycle steer tube. A bicycle head tube (not illustrated) is the front most vertical tubular section of the bicycle frame and a bicycle steer tube (not illustrated) is the section of the bicycle fork that is configured and rotates within the bicycle frame's head tube and the threadless headset. The spacer 3, located above the race 1 in the axial direction and about a bicycle steer tube, is free to rotate about the axial direction when the locking assembly is in the unlocked configuration and fixed when the locking assembly is in the locked configuration (unlocked and locked configurations are discussed below).

Figure 2:
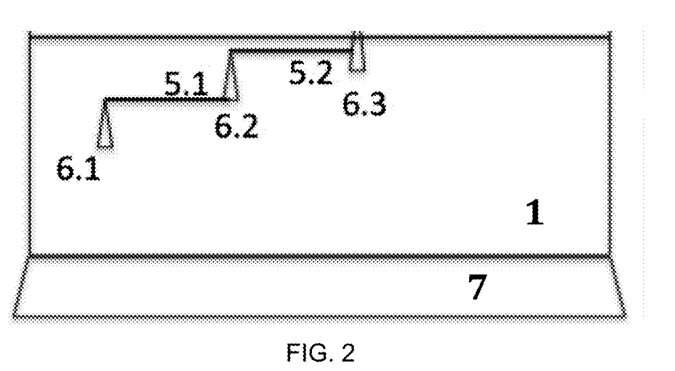
FIG. 2 is a side view of the upper head tube race with spin-lock grooves 1, illustrating the geometry of the race's 1 external spin-lock grooves. As shown, the race 1 contains three vertical grooves (6.1, 6.2 and 6.3) and two horizontal grooves (5.1, 5.2) that are offset and connected. The horizontal grooves (5.1, 5.2) are offset from each other in the radial and axial directions. The vertical grooves (6.1, 6.2 and 6.3) are also offset from each other in the radial and axial directions. Vertical groove 6.3 extends through the upper axial edge of the race 1.
Figure 3:
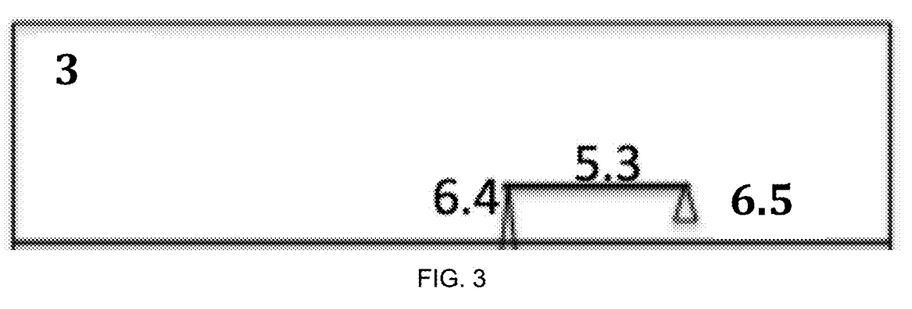
FIG. 3 is a side view of the headset spacer with spin-lock grooves (component 3), illustrating the geometry of the spacer's grooves. As shown, the spacer contains two vertical grooves (6.4 and 6.5) and one horizontal groove (5.3). The vertical grooves (6.4 and 6.5) are offset from each other in the radial direction. Vertical groove 6.4 extends through the lower axial edge of the spacer 3.

As illustrated in FIG. 2, above the race's 1 flange 7 in the axial direction is the race's 1 wider diameter cylinder 8 which contains the race's 1 external horizontal spin-lock grooves 5.1 and 5.2 and external vertical spin-lock grooves 6.1, 6.2, and 6.3. As further illustrated in FIG. 3, the spacer 3 has external horizontal spin-lock groove 5.3 and external vertical spin-lock grooves 6.4 and 6.5. When the locking components are in the unlocked configuration, the spacer 3 rotates through the same angular displacement about the axial direction as the bicycle handlebars due to axial pressure applied to the handlebar stem and headset components when the bicycle's steer tube, headset, stem, and handlebars are assembled. Thus, the spacer 3 is configured so that the vertical groove 6.4 is aligned in the axial direction with the fixed race's 1 vertical groove 6.3 when the handlebars are straight.

Figure 4:
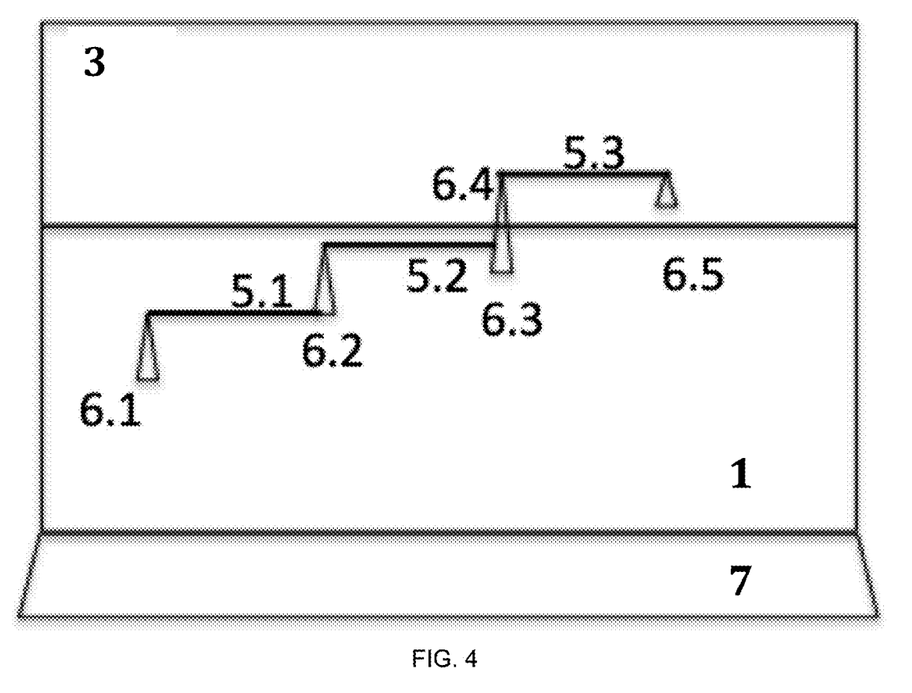
FIG. 4 is a side view indicating the alignment of the upper head tube race with spin-lock grooves (component 1) and headset spacer with spin-lock grooves (component 3). As shown, the race's vertical groove 6.3 and the spacer's vertical groove 6.4 line up vertically (in the axial direction). This alignment allows the pins of the external ring lock 2 (not shown in FIG. 4) to slide between the race 1 and spacer 3 along the grooves.
Figure 5A:
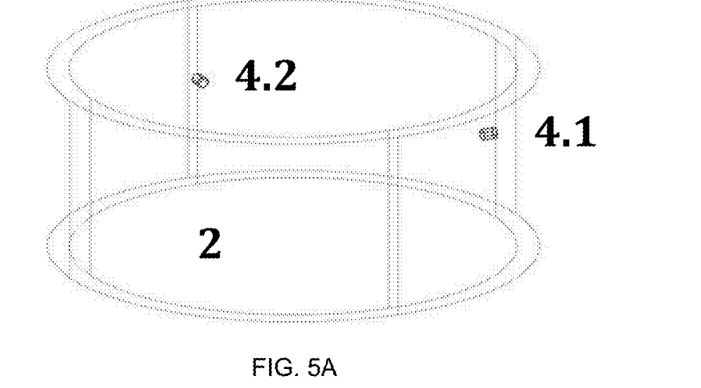
Figure 5B:
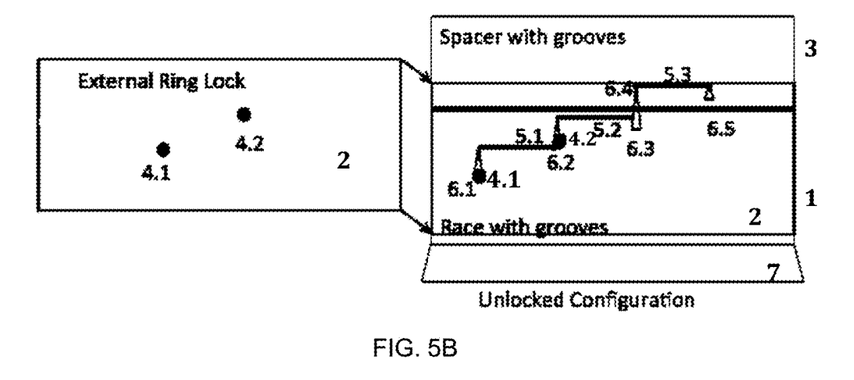
Figure 5C:
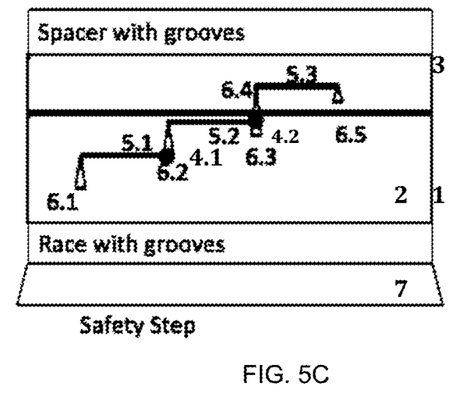
Figure 5D:
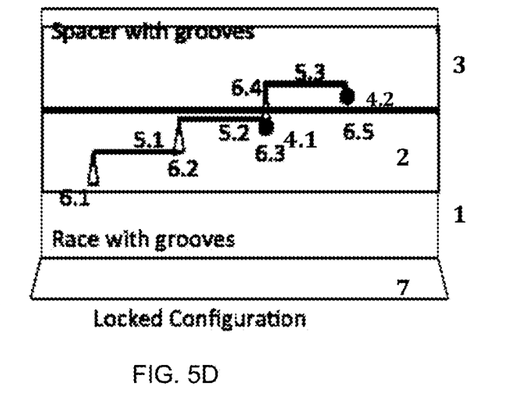

As shown in FIG. 4, vertical groove 6.3 extends through the upper axial edge of the race 1 and vertical groove 6.4 extends through the lower axial edge of the spacer 3 such that the pin 4.2 of the external ring lock 2 (FIG. 5) is able to slide between the race 1 and spacer 3 along grooves 6.3 and 6.4. Sliding pin 4.2 from 6.3 to 6.4 is part of the transition between unlocked and locked headset configurations.

Referring to FIG. 5, the external ring lock 2 configurations and locking method are discussed: When the locking components are in the locked configuration, the spacer 3 (now fixed to the race 1) prohibits free rotation of the handlebars about the axial direction due to axial pressure applied to the handlebar stem and headset components (including the race 1 and spacer 3) when the bicycle's steer tube, headset, stem, and handlebars are fully assembled. The axial pressure causes substantial friction between the spacer 3 and headset stem, allowing the fixed spacer 3 to prohibit free rotation of the stem and handlebars. The pins 4.1 and 4.2 are offset within the external ring lock 2 and grooves 5.1-5.3 and 6.1-6.5 are oriented to permit the following assembled configurations: Pin 4.1 is in vertical groove 6.1 and pin 4.2 is in vertical groove 6.2 for the unlocked configuration (spacer 3 is free to rotate with the stem and handlebars); Pin 4.1 is slid out of vertical groove 6.1, across horizontal groove 5.1, and into vertical groove 6.2, while pin 4.2 is slid out of vertical groove 6.2, across horizontal groove 5.2, and into vertical groove 6.3 for the safety configuration (an added step between the unlocked and locked configurations to prevent accidental locking of the headset); Pin 4.1 is slid out of vertical groove 6.2, across horizontal groove 5.2, and into vertical groove 6.3, while pin 4.2 is slid out of vertical groove 6.3, across horizontal groove 5.3, and into vertical groove 6.3 for the locked configuration.

Figure 6:
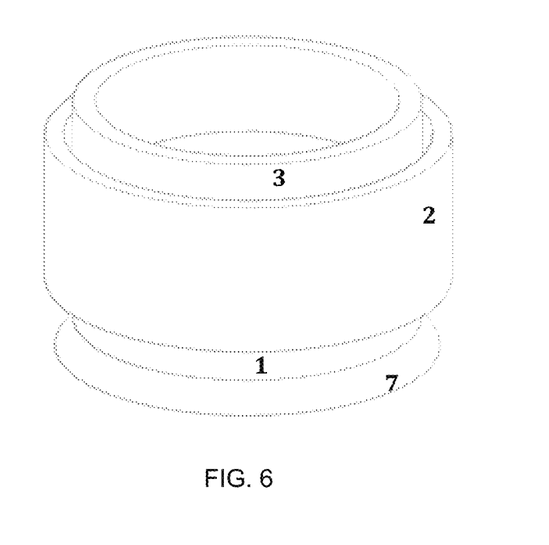

Referring to FIG. 6, the three locking components are shown as they would be when assembled on a bicycle where the external ring lock 2 is about the race 1 and spacer 3 with pins 4.1 and 4.2 in the grooves of the race 1 and spacer 3. The ring's 2 axial dimension is large enough to cover all of the grooves on the race 1 and spacer 3 in all of the possible positions of the ring 2 as it is spun about the race 1 and spacer 3 along their grooves. The interior cylindrical surface of the external ring lock component 2 sits flush about the race 1 and spacer 3 and has a seal at both of its axial ends to prevent external particles from entering the area between the external ring lock and the grooved components.

In understanding the scope of this invention, the use of the term "comprising" and its derivatives are intended to be open ended terms that specify the presence of the stated characteristics, elements, parts, assemblies, integers, and/or steps, but do not exclude the presence of other unstated characteristics, elements, parts, assemblies, integers, and/or steps. The foregoing also applies to words having similar meanings such as the terms, "including", "having" and their derivatives. The terms " art", " section", "component", "assembly" or "configuration" when used in the singular can have the dual meaning of a single part or a plurality of parts. As used herein to describe the above embodiment(s), the following configuration and directional terms "about", "within", "on top", "interior", "exterior", "above", "below", "vertical", "horizontal", "axial", "radial" and "rotational" as well as any other similar configuration or directional terms refer to those directions of a bicycle equipped with the locking threadless bicycle headset. Accordingly, these terms, as utilized to describe the locking threadless bicycle headset should be interpreted relative to a bicycle equipped with the bicycle headset as used in the normal riding position. Finally, the use of the term "Nominal" and its derivatives refer to normal functionality, capability, intention, or use.

While only a subset of embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by more than one, and vice versa. The structures and functions of one embodiment can be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle headset comprising; an upper head tube race with a continuous horizontal and vertical pattern cut into an exterior of the upper head tube race, forming spin-lock grooves; a headset spacer with spin-lock grooves that sits on top of the upper head tube race, and; an external ring lock that seals around the upper head tube race and headset spacer that has two internal radially-pointing male pins that are horizontally and vertically offset, allowing the pins to slide between the spin-lock grooves of the head tube race and headset spacer.

2. The bicycle headset according to claim 1, wherein the upper head tube race with spin-lock grooves comprises two horizontal female grooves that are offset vertically and horizontally with one vertical female groove in between that connects the horizontal grooves, forming a step, and two additional vertical female grooves that extend from the outer ends of the horizontal grooves, the vertical and horizontal grooves are carved into the exterior of the upper head tube race.

3. The upper head tube race with spin-lock grooves according to claim 2, wherein the vertical female grooves get narrower from bottom to top and wherein the vertical female groove that extends from the outer end of the higher horizontal female groove extends both below and above said higher horizontal female groove and up through the top of the upper head tube race.

4. The bicycle headset according to claim 1, wherein the external ring lock comprises:
   a. a first contact surface, being the ring's internal cylindrical walls, which seals around exterior cylindrical surfaces of the upper head tube race with spin-lock grooves and headset spacer with spin-lock grooves, and;
   b. the internal radially-pointing male pins protrude inward from the first contact surface and fit tightly and slide with high friction within the horizontal grooves of the upper head tube race with spin-lock grooves and headset spacer with spin-lock grooves, and that slide with less friction as they are slid into the bottom ends of the vertical spin-lock grooves.

5. The external ring lock according to claim 4, wherein the two male pins are offset horizontally and vertically such that both pins fit into the bottom ends of any two neighboring vertical grooves that exist on the upper head tube race with spin-lock grooves and headset spacer with spin-lock grooves.

6. The bicycle headset according to claim 1, wherein the headset spacer with spin-lock grooves comprises one horizontal groove with left and right ends, that has two vertical grooves that extend from said left and right ends of the horizontal groove, wherein each groove is carved into the exterior surface of the spacer.

7. The headset spacer with spin-lock grooves according to claim 6, wherein the vertical grooves get narrower from bottom to top and wherein the vertical groove that extends from the left end of the horizontal groove extends down and through a bottom end of the spacer.

\* \* \* \* \*